(12) United States Patent
Erickson et al.

(10) Patent No.: US 10,701,921 B2
(45) Date of Patent: Jul. 7, 2020

(54) FISHING RIG STORAGE DEVICE AND SYSTEM

(71) Applicants: Josh Erickson, Woodbury, MN (US); David Levy, Des Plaines, IL (US)

(72) Inventors: Josh Erickson, Woodbury, MN (US); David Levy, Des Plaines, IL (US)

(73) Assignee: Josh Erickson, Woodbury, MN (US)

( * ) Notice: Subject to any disclaimer, the term of this patent is extended or adjusted under 35 U.S.C. 154(b) by 139 days.

(21) Appl. No.: 15/806,683

(22) Filed: Nov. 8, 2017

(65) Prior Publication Data

US 2019/0133103 A1 May 9, 2019

(51) Int. Cl.
*A01K 97/06* (2006.01)
*B65D 75/00* (2006.01)
*B65D 73/00* (2006.01)

(52) U.S. Cl.
CPC .......... *A01K 97/06* (2013.01); *B65D 73/0035* (2013.01); *B65D 75/002* (2013.01)

(58) Field of Classification Search
CPC ..................................................... A01K 97/06
See application file for complete search history.

(56) References Cited

U.S. PATENT DOCUMENTS

| | | | | |
|---|---|---|---|---|
| 1,682,631 A * | 8/1928 | Sayler | ...................... | D06H 1/04 242/164 |
| 2,422,870 A * | 6/1947 | Willis | .................... | A01K 97/06 43/57.2 |
| 2,936,963 A * | 5/1960 | Louis | ...................... | A01K 97/06 242/405.1 |
| 3,728,839 A * | 4/1973 | Glick | ............... | A61B 17/06133 53/425 |
| 4,006,554 A * | 2/1977 | Tice | ........................ | A01K 97/06 43/57.2 |
| 4,924,621 A * | 5/1990 | Hawranik | .............. | A01K 97/06 43/57.2 |
| 4,927,016 A * | 5/1990 | Fuller | ..................... | A01K 97/06 206/315.11 |
| 5,438,791 A * | 8/1995 | Sherrod | ................. | A01K 97/06 43/57.1 |
| 8,943,740 B1 * | 2/2015 | Rathje, Jr. | .............. | A01K 97/06 43/57.2 |
| 10,206,385 B2 * | 2/2019 | Preller, Jr. | .............. | A01K 97/12 |

(Continued)

FOREIGN PATENT DOCUMENTS

FR 2578716 A1 * 9/1986 ............. A01K 97/06

*Primary Examiner* — Richard G Davis
(74) *Attorney, Agent, or Firm* — Cahn & Samuels, LLP

(57) ABSTRACT

A fishing rig storage device that is removably insertable into a receiving slot incorporated in at least one of a dividing wall or an interior surface of a tackle container is illustrated and described. The fishing rig storage device includes a mounting tab having quartered sections and a plurality of notches formed along a perimeter. Each quartered section includes at least one of the plurality of notches. A fishing rig having a hook assembly, a line, and a tail is secured to the mounting tab by securing the hook assembly to a first notch, selectively wrapping the line around the plurality of notches, and securing the tail to a slit extending from the perimeter. The line is preferably arranged around the mounting tab to minimize catching or snagging of the line on the hook assembly when the line is unwrapped from the mounting tab.

18 Claims, 2 Drawing Sheets

(56) References Cited

U.S. PATENT DOCUMENTS

2006/0236587 A1\* 10/2006 Rankine ................. A01K 97/06
                                                    43/25.2
2007/0011939 A1\* 1/2007 Sakai ..................... A01K 97/06
                                                    43/54.1
2017/0265448 A1\* 9/2017 Duffy ..................... A01K 97/06

\* cited by examiner

FISHING RIG STORAGE DEVICE AND SYSTEM

FIELD OF INVENTION

The invention relates generally to fishing tackle and associated equipment. More particularly, the invention relates to a fishing rig storage device and novel tackle container incorporating one or more fishing rig storage devices. The fishing rig storage device, which is removably insertable into the tackle container, includes a mounting tab for securing a line/leader therearound in a configuration that minimizes snagging or entangling the line/leader with a connected hook assembly.

BACKGROUND OF THE INVENTION

Fishing lines/leaders are often a desirable item for outdoorsmen to have on-hand during fishing activities. Conventional lines/leaders are known to be available in a variety of weights, types, and gauges and perform an important function when fishing for various species of fish. Leaders, in particular, provide the benefit of minimizing the likelihood that a fish with teeth will sever a fisherman's line. Leaders associated with a rig also make it easier for fishermen to switch baits and lures by avoiding the need to cut and retie their fishing line when a different tackle is desired.

While fishing leaders have generally resolved an inherent problem in the art of fishing, namely the ability for fish to bite through lines, storage of tackles such as lines/leaders tend to create their own difficulties for fishermen. Many outdoorsmen are familiar with the inconveniences that arise when lines/leaders become snagged, entangled, or knotted from unsecured storage in a tackle box or other location. Exerting the effort to disentangle the line/leader is a difficulty that not only reduces the fisherman's enjoyment of the outing but also hinders his or her ability to engage in the sport of fishing. Likewise, when fishing activities have concluded, it is particularly difficult for a fisherman to store all of his or her fishing rigs in one place without having the lines/leaders become snagged or entangled prior to the next outing, not only with each other but also with their connected hook assembly.

The burden created by entangled lines/leaders is a plight that extends beyond the individual fisherman. Even in commercially packaged settings, including those with lines/leaders sold as part of a rig, the line/leader often becomes entangled in its packaging or snagged on the hook assembly before the consumer even has an opportunity to remove it. Depending on the severity and frequency of the entangled lines/leaders, this packaging deficiency may cause the brand or company associated with the goods to suffer a reputational impact with the consumer, if not properly addressed and remedied.

Attempts to improve line/leader storage deficiencies include a cylindrical plastic and foam holder marketed by LINDY that is capable of storing up to 12 rigs. Despite the objectives of the device, the holder is particularly bulky and does not store easily in a conventional tackle box. As such, it often requires commercial sales of the product to occur in sets of three with its own separate box. Furthermore, when fishing line/leader is wrapped around the cylinder and attached thereto, the line/leader does not always have enough tension to keep itself stretched tight around the cylinder. Consequently, slack in the line/leader allows the rig(s) to become unsecured from the cylinder and often results in self-entanglement or entanglement with other proximately positioned tackles.

Another attempt to address line/leader entanglement issues includes a rectangular board marketed by CABELA'S. The board, which is sold commercially in sets of 9 and 15, holds two leaders and requires its own separate tackle box. Thus, the board and associated extra tackle box becomes one more piece of equipment the fisherman is required to carry along on a fishing expedition. Inside the extra tackle box, the boards are also arranged in such a way that the hook of a first rig tends to snag the line/leader of a second rig. This often results in the very problem the board is intended to prevent.

Accordingly, there is a need to develop a fishing rig storage device which facilitates commercial and recreational storage of fishing rigs in a manner that minimizes snagging or entangling of the line/leader with itself and/or a connected hook assembly, so that the fishing rig can be removed from the storage device in an operational arrangement with minimal effort. It would also be desirable to develop a fishing rig storage device that cooperates with the fisherman's primary tackle box, while reducing size and transportation burdens resulting from additional equipment needs during fishing outings.

SUMMARY OF THE INVENTION

It is an object of the invention to overcome problems associated with the existing art.

Another object of the invention is to provide a novel fishing rig storage device which secures a line/leader in a manner that minimizes the ability of the line/leader to become entangled with itself and other proximately positioned structures.

A further object of the invention is to provide a mounting tab configured to secure a line/leader in an arrangement that facilitates unencumbered removal of the fishing rig from the mounting tab.

Still another object of the invention is to provide a fishing rig storage system having a storage device that removably cooperates with a tackle container.

Still a further object of the invention is to maintain organization of fishing rigs within a tackle container.

Yet another object of the invention is to provide a fishing rig storage device that minimizes problems associated commercial packaging of fishing rigs.

These and other objects are satisfied by a fishing rig storage device, comprising: a mounting tab including quartered sections and a plurality of notches formed along a perimeter, each of said quartered sections including at least one of said plurality of notches; a fishing rig having a hook assembly and a line including a tail, said hook assembly secured to a first one of said plurality of notches and extending in a direction of a second one of said plurality of notches, said line connected to said hook assembly and positioned around said mounting tab in said plurality of notches; and a first slit extending from said perimeter to removably attach said tail to said mounting tab; wherein said line is selectively wrapped around said mounting tab such that said line does not overlay said hook assembly when said line extends between said plurality of notches other than said first one of said plurality of notches; and wherein said line does not extend between said first one of said plurality of notches and said second one of said plurality of notches alongside said hook assembly.

The foregoing and still other objects are satisfied by a fishing rig storage system, comprising: a mounting tab having a plurality of notches formed along a perimeter, said plurality of notches configured to receive a fishing rig positioned around said mounting tab, said fishing rig including a tail; a first slit extending from said perimeter to removably attach the tail to said mounting tab; and a tackle container having at least one of a first dividing wall or a first interior surface and a receiving slot incorporated in the at least one of said first dividing wall or said first interior surface to secure said mounting tab at said perimeter; wherein said mounting tab is removably insertable into said receiving slot.

The foregoing and still other objects are satisfied by a method of using a fishing rig storage device including a mounting tab having quartered sections, a slit, and a plurality of notches and a fishing rig having a hook assembly, a line, and a tail, comprising: securing said hook assembly to a first one of said plurality of notches so that said hook assembly extends in a direction of a second one of said plurality of notches; positioning said line in at least one of said plurality of notches in each quartered section by selectively wrapping said line around said mounting tab such that said line does not extend between said first one of said plurality of notches and said second one of said plurality of notches alongside said hook assembly and said line does not overlay said hook assembly when said line extends between said plurality of notches other than said first one of said plurality of notches; and removably attaching said tail to said slit.

The present invention contemplates a generally rectangular mounting tab for selectively wrapping a line/leader therearound. The mounting tab includes a plurality of notches formed along a perimeter configured to engage parts of a fishing rig such as a line/leader or hook assembly. The hook assembly, which is connected to the line/leader, is hooked to a first notch and preferably positioned against the mounting tab in the direction of a second notch. The line/leader is subsequently positioned in the plurality of notches and wrapped around the mounting tab such that tension and friction introduced to the line/leader allows the fishing rig to remain secured to the mounting tab.

The plurality of notches are configured to prevent the line/leader from sliding off an end of the mounting tab while the line/leader is wrapped around the mounting tab under tension. When the line/leader reaches its final winding around the mounting tab, a tail of the line/leader is thereby provided for removable attachment to a slit extending from the perimeter. The slit pinches the tail therein to secure the tail in place and maintain tension on the line/leader against the mounting tab. In some embodiments, a second slit extends from the perimeter to provide an alternative attachment location for accommodating tails of different lengths and positions.

In certain embodiments, a notch is positioned along each main edge of the mounting tab. Each of the notches may be centrally located along their corresponding edges and may be formed to have, but is not limited to, a semi-circular shape. Such arrangements for the plurality of notches facilitates securing the line/leader to the mounting tab in a number of different orientations. For example, in configurations having quartered sections including at least one notch in each quartered section, the line/leader may be wrapped around the mounting tab vertically, horizontally, diagonally, or in combinations thereof. The line/leader is preferably wrapped around the mounting tab such that it does not overlay the hook assembly when the line/leader extends across the mounting tab between the plurality of notches, although some overlapping of the hook assembly proximate to the first notch is acceptable as long as it does not impede unwrapping the line/leader from the mounting tab by snagging or catching on the hook assembly. It is also preferable that the line/leader does not to extend across the mounting tab between the first notch and the second notch alongside the hook assembly, as this configuration is similarly prone to snagging or catching against the hook assembly when the line/leader is unwrapped.

A preferred method of unwrapping the fishing rig from the mounting tab includes removing the tail from the slit, holding onto the tail by hand, and releasing the mounting tab subject to the force of gravity. As the mounting tab falls under the influence of gravity, the fishing rig conveniently twirls off of/unravels from the mounting tab in an orderly manner without catching on the hook assembly. This provides the fisherman with quick and efficient access to a fishing rig that is suitable for prompt use. In some embodiments, the mounting tab incorporates a magnet to secure the mounting tab to metal structures such as a tackle container or an inside wall of a fishing boat, particularly while a removed fishing rig is being used by the fisherman. The magnet is believed to facilitate removal of the fishing rig when the mounting tab is released subject to the force of gravity because it is believed that added weight from the magnet influences the gravitational unwrapping process to occur more rapidly.

The mounting tab of the present invention further addresses problems associated with packaging techniques practiced by commercial suppliers. The arrangement of a fishing rig around the mounting tab in the above-described manner minimizes the potential for undesirable snagging, tangling, or knotting of the line/leader while secured by commercial packaging such as a box, a strap, a backboard, shrink wrap, a sleeve, a binder, or a sealed bag or container. Following removal of the mounting tab from its commercial packaging, the fishing rig is quickly and efficiently separated from the mounting tab using the force of gravity by the technique stated above.

The invention further contemplates a fishing rig storage system including a tackle container (e.g., a tackle box) which incorporates a receiving slot to removably secure the mounting tab at its perimeter. In embodiments, the tackle container includes a pair of receiving slots suitable for receiving and securing two portions of the perimeter simultaneously. The mounting tab may incorporate a rounded corner or beveled corner to facilitate insertion of the mounting tab into the receiving slot, for example, when the pair of receiving slots are configured to oppose each other.

The receiving slots are formed in at least one of a dividing wall or an interior surface of the tackle container. In some embodiments, the dividing wall or the interior surface includes a series of spaced apart receiving slots (or pairs of spaced apart receiving slots) for receiving a series of mounting tabs. When one or more dividing walls are incorporated in the tackle container, the dividing walls may be configured to be connectably rearrangeable. In addition, the dividing wall or the interior surface can be configured to provide single or multi-level arrangements for the mounting tab(s) inside the tackle container.

In other embodiments, the mounting tab serves as a removable divider suitable for compartmentalizing the tackle container and maintaining organization of tackles. The fishing rig storage system may include a tackle container specifically designed to receive removable mounting tabs or it may require modifying existing tackle container styles such as three-box hard cover, three-box duffle bag, or two-box backpack. A mounting tab used as a removable tackle container divider is advantageous because it allows tackles such as lines/leaders to be stored in close proximity to one another without becoming entangled. It also permits the fisherman to easily locate specific fishing rigs without having to sift through other potentially tangled items.

In other embodiments, the fishing rig storage system includes a tackle container that is insulated around an exterior similar to a conventional cooler. The insulated fishing rig storage system preferably comprises an exterior receiving slot for receiving and securing an additional tackle item (e.g., a second smaller box) to the exterior of the tackle container, and more preferably includes a slot on each side of the tackle container to receive and secure at least two additional tackle items simultaneously. In still other embodiments, the tackle container is configured as a binder/folder having at least one pouch and/or page-like sleeve suitable for receiving and securing the fishing rig storage device therein. The pouch or sleeve facilitates storing a quantity of mounting tabs in a common container area, which thereby reduces transportation burdens.

The terminology used herein is for the purpose of describing particular embodiments only and is not intended to be limiting of the invention.

As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

For definitional purposes and as used herein "attached", "connected", and "secured" includes physical, whether direct or indirect, affixed or adjustably mounted. Thus, unless specified, "attached", "connected", and "secured" is intended to embrace any operationally functional connection.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

References to "one embodiment", "an embodiment", "in embodiments", or variations thereof means that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as would be readily apparent to those skilled in the art. Thus, the invention can include any variety of combinations and/or integrations of the embodiments described herein.

For definitional purposes and as used herein, the term "hook assembly" is defined to include a hook individually as well as tackles having a hook incorporated in or a hook used in combination with another tackle item, such as a lure, bait, sinker, swivel, etc., that connects the hook to a line or, in more specific situations, to a leader.

For definitional purposes, the term "leader" is a specific type of "line" that connotes a thicker gauge. As used herein, "line" and "leader" are intended to be interchangeable terms to the extent that their interchangeability would be readily appreciated by those skilled in the art.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

For definitional purposes and as used herein, the term "quartered section" is defined as a region of a mounting tab bounded by two perpendicular lines that pass through a center of the mounting tab.

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to the accompanying drawings, which are shown by way of illustration to the specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

DETAILED DESCRIPTION OF THE DRAWINGS

Figure 1A:
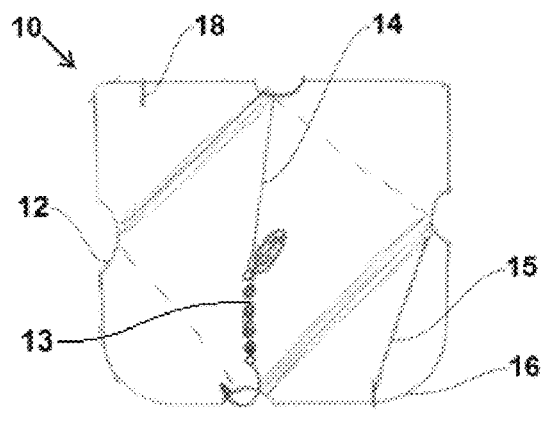
FIG. 1A illustrates a fishing rig storage device having a fishing rig secured to a mounting tab in accordance with an embodiment the present invention.

FIG. 1A illustrates an embodiment of a fishing rig storage device including a mounting tab 10 and a fishing rig having a hook assembly 13, a line 14, and a tail 15. The mounting tab 10 includes a plurality of notches 12 formed along a perimeter with at least one notch formed in each of a separate quartered section. More particularly, at least four of the plurality of notches 12 are formed along the perimeter in such a way that two perpendicular lines can extend through a center of the mounting tab 10 to separate the four notches into respective quartered sections. For example, one way in which the four notches illustrated in FIG. 1D can be separated into quartered sections is by drawing an "X" (i.e., two perpendicular lines) through the center of the mounting tab 10, as shown by lines A-A. Lines B-B illustrate an alternative way to separate the mounting tab 10 into quartered sections for embodiments where the plurality of notches 12 are not centrally disposed along the edges of the mounting tab 10 as illustrated in FIG. 1D.

As illustrated in FIGS. 1A-D, the plurality of notches 12 are depicted at the 3 o'clock, 6 o'clock, 9 o'clock, and 12 o'clock positions. That is, each of the plurality of notches 12 is separated from its neighboring notch by a 90 degree angle defined by lines extending from the center of the tab to the perimeter, each line bisecting a neighboring notch. In keeping with the invention, however, neighboring notches do not necessarily need to be positioned relative to one another at 90 degree angles from the center, as long as at least one of the plurality of notches 12 is formed somewhere along the perimeter of the mounting tab 10 in each of the separately quartered sections. It is likewise permissible for the plurality of notches 12 to comprise more than four notches, thereby providing at least one of quartered section with multiple notches. The configuration of the plurality of notches 12 in this manner facilitates wrapping the line 14 around the mounting tab 10 in arrangements that minimize catching or snagging of the line 14 on the hook assembly 13 when the line 14 is unwrapped from the mounting tab 10.

The mounting tab can be made of plastic, rubber, cardboard, wood, metal, magnetic material, or any other material suitable for securing a fishing rig therearound. The mounting tab 10 may comprise a plurality of edges forming a perimeter that is either regularly-shaped or irregularly-shaped. In the illustrated embodiment, the mounting tab 10 includes a generally rectangular/square perimeter. In other embodiments, the mounting tab 10 is configured to have a single edge, such as being shaped to include a circular or curved perimeter. Nevertheless, the shape of the mounting tab is preferably configured so that it removably cooperates with a receiving slot 22 incorporated in a tackle container 20 (illustrated in FIG. 2).

In some embodiments, at least one of the plurality of notches 12 is centrally disposed along an edge of the mounting tab 10. The plurality of notches 12 may be formed in any suitable configuration, such as having a semi-circular shape, that minimizes the ability of the line 14 to slip off an end of the mounting tab 10 while the line 14 is wrapped around the mounting tab 10 under tension. Suitable arrangements for the line 14 include wrapping it across the mounting tab vertically, horizontally, diagonally, and in combinations thereof.

The hook assembly 13 is secured to a first notch and preferably positioned to extend in a direction of a second notch so that there is minimal slack in the portion of the line 14 which extends from the hook assembly 13 to the second notch. The hook assembly 13 includes a hook individually and/or any combination of tackles, such as lures, baits, sinkers, swivels, etc., that connect the hook to the line 14. In some embodiments, such as those including a lure or an elongated hook, the hook assembly 13 may be longer than the mounting tab 10 (i.e., the hook assembly 13 may be longer than the distance between the first notch and second notch). In such embodiments, the line 14 extends directly from the hook assembly 13 to any of the plurality of notches to thereby initiate the first wrap of the line 14 around the mounting tab 10.

In order to minimize catching or snagging of the line 14 during removal of the fishing rig from the mounting tab 10, the line 14 is wrapped around the plurality of notches 12 in such a way that it does not overlay irregular portions of the hook assembly 13. As illustrated in FIG. 1A, however, some overlapping of the hook portion of the hook assembly 13 is permissible proximate to the first notch, as this arrangement does not impede unwrapping the line 14 during preferred removal techniques. In FIG. 1A, the line 14 is also arranged to avoid extending between the first notch and the second notch alongside the hook assembly 13, as such a configuration is prone to catching or snagging against the hook assembly 13. However, the line 14 may extend between the first notch and the second notch on the backside of the mounting tab 10 without creating catching or snagging issues caused by contact with the hook assembly 13.

In embodiments where the hook assembly 13 is shorter than the distance between the first notch and the second notch, it is possible for the line 14 to extend across the front of the mounting tab 10 to an opposing notch without overlaying the hook assembly 13. This is because the hook assembly 13 only partially extends across the mounting tab 10 from the first notch and is connected to a beginning portion of the line 14, which extends the remainder of the distance across the mounting tab 10 to the second notch. If the line 14 is wrapped around the mounting tab 10 to subsequently cross itself at this remainder distance, it does not overlay the hook assembly 13 and does not catch or snag on the hook assembly 13. Thus, the line 14 may be positioned in the plurality of notches 12 in a number of different configurations that are suitable for securing the line 14 to the mounting tab 10 without being impeded by the hook assembly 13.

When selective wrapping of the line 14 reaches its final winding around the mounting tab 10, a tail 15 is provided. A slit 18 extending from the perimeter is used to removably secure the tail 15 to the mounting tab 10. The slit 18 pinches the line 14 therein and maintains tension on the line 14 to prevent it from unraveling from the mounting tab 10. In certain embodiments, the fishing rig storage device includes two slits 18 located proximate to opposite corners of the mounting tab 10 to provide an alternative location for the tail 15 to attach. Spacing of the slits 18 in this manner provides greater flexibility for securing the tail 15, since the length and location of the final tackle winding/tail 15 is often unpredictable.

In accordance with an embodiment, the mounting tab 10 may be incorporated in point of sale packaging for a fishing rig. In such an embodiment, the line 14 is positioned around the mounting tab 10 so that it does not catch on the hook assembly 13 during removal of the rig as described above. The fishing rig/mounting tab assembly may then be provided with, mounted to, or disposed in suitable commercial packaging. For example, the fishing rig/mounting tab assembly may be disposed in a box, hung from a strap, mounted to a backboard, enclosed in shrinkwrap packaging, positioned in sleeve, placed in a binder, disposed in a sealed bag or container, etc. A preferred removal technique of the fishing rig includes detaching the tail 15 from the slit 18, holding onto the tail 15 by hand, and releasing the mounting tab 10 subject to the force of gravity so that line 14 rolls off of the mounting tab 10 in an unentangle fashion. The advantages provided by the above-described wrapping arrangement around the mounting tab 10 are beneficial in the context of point of sale commercial packaging because it allows the product (i.e., the fishing rig) to be removed from its packaging in an orderly manner suitable for prompt use by a fisherman.

In some embodiments, the mounting tab 10 is configured to include beveled or rounded bottom corners 16 to facilitate removable attachment of the mounting tab 10 to a fishing rig storage system. Specifically, the rounded bottom corners 16 make it easier to guide the mounting tab 10 into receiving slots 22 incorporated in a corresponding tackle container 20 (illustrated in FIG. 2).

Figure 1B:
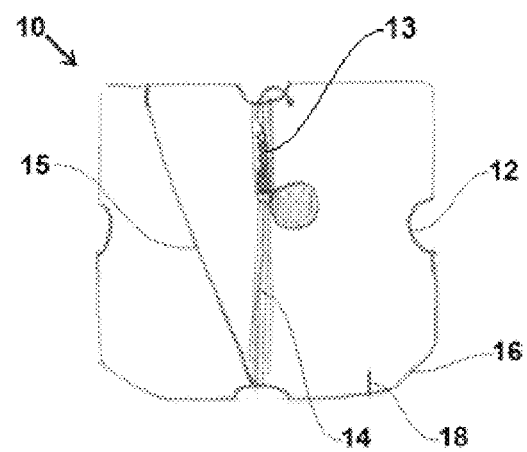
FIG. 1B illustrates a fishing rig storage device having a fishing rig secured to a mounting tab in accordance with an embodiment of the present invention.
Figure 1C:
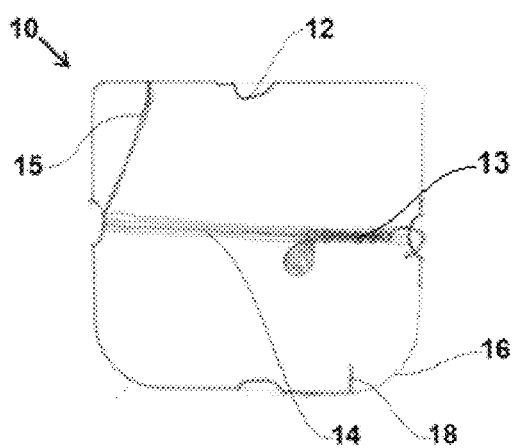
FIG. 1C illustrates a fishing rig storage device having a fishing rig secured to a mounting tab in accordance with an embodiment the present invention.
Figure 1D:
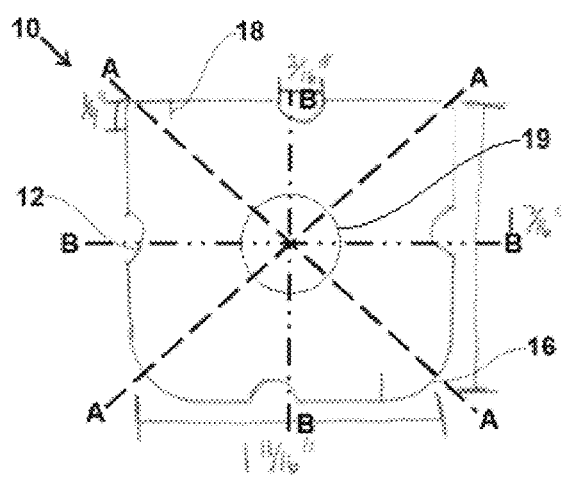
FIG. 1D illustrates a mounting tab having quartered sections in accordance with an embodiment the present invention.

FIGS. 1B-C illustrate wrapping configurations for the line 14 that are suitable for removably securing the mounting tab 10 in a fishing rig storage system.

In some embodiments mounting tab 10 may comprise a magnetic structure. For example, as illustrated in FIG. 1D, mounting tab 10 incorporates a magnet 19 for securing the mounting tab 10 to metal structures such as tackle containers 20 or fishing boats. The magnet 19 may be affixed to an external surface of the mounting tab 10 or it may be secured to the mounting tab 10 internally, such as being sealed between two mounting tab surfaces. The magnet 19 is not limited to any size, weight, shape, or position along the mounting tab 10, although it is preferable that the magnet 19 does not impede unwrapping the line 14 from the mounting tab 10. The increased weight to the fishing rig storage device created by the incorporated magnet 19 is believed to facilitate a faster/more efficient removal of the fishing rig when gravitational separation techniques are used.

In other embodiments, the magnetic structure is the mounting tab itself, formed from magnetic material. This is particularly advantageous during gravitational removal techniques because the magnet 19 reduces the ability of the mounting tab 10 to separate from a metallic hook assembly 13 when gravity influences the mounting tab 10 to reach the end of the unwrapping process while the user holds onto the tail 15. The magnet 19 also reduces relative movement of the hook assembly 13 with respect to the mounting tab 10 when the fishing rig is wrapped around the mounting tab 10.

While not intended to be limiting as to relative parameters, FIG. 1D further illustrates a specific embodiment of the invention where the mounting tab 10 has a height of 1 7/16 in. (3.651 cm.), a width of 1 1/16 in. (2.699 cm.), and includes rounded bottom corners 16. Likewise not intended to be limiting as to relative parameters, the embodiment illustrated in FIG. 1D further includes a mounting tab 10 having one or more slits 18 extending from the perimeter that are about 1/4 in. (0.635 cm.) in length and one or more notches 12 having a 3/16 in. (0.476 cm.) diameter.

Figure 2:
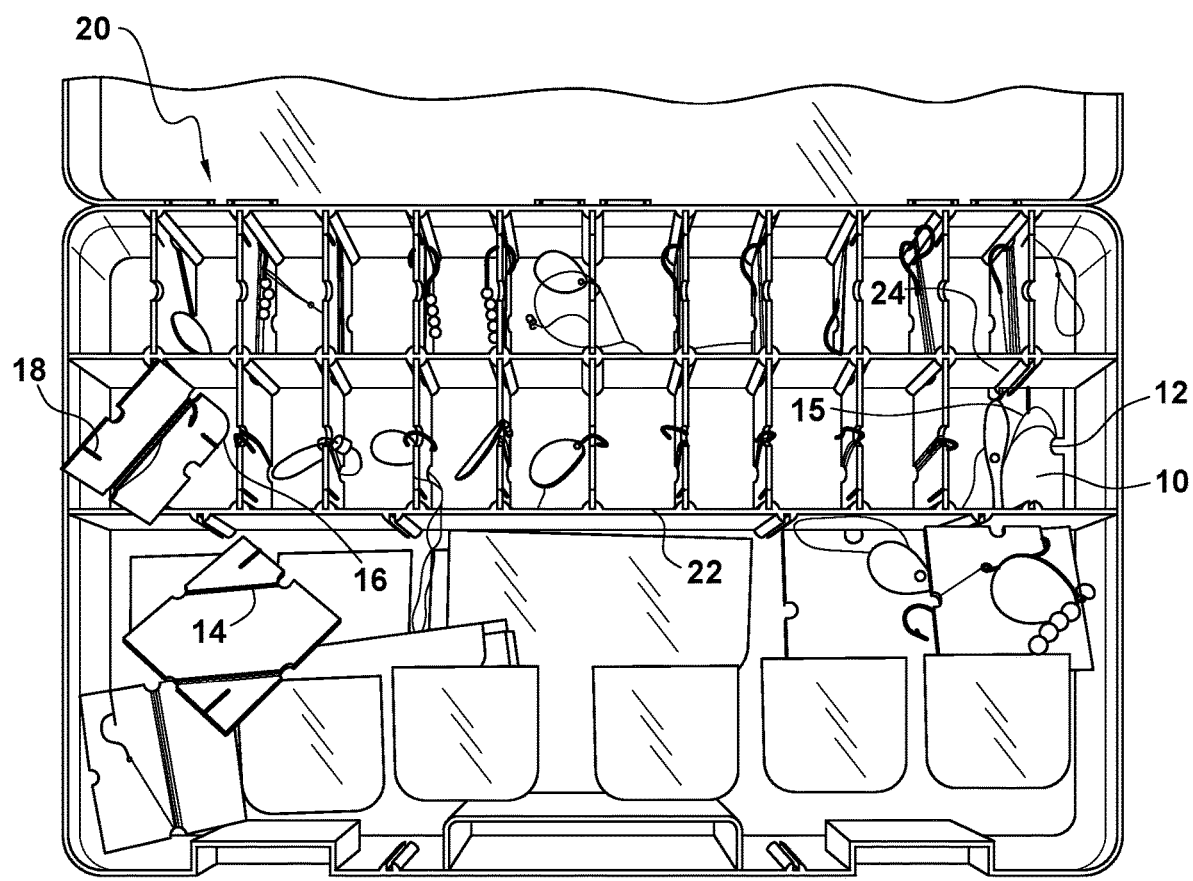
FIG. 2 shows a top view of a fishing rig storage system having removable fishing rig storage devices.

FIG. 2 illustrates a tackle storage system including a tackle container 20 (e.g., a tackle box) configured to removably receive one or more mounting tabs 10. The tackle container 20 includes at least one receiving slot 22 for removably securing the mounting tab 10 at a perimeter inserted therein, although any structure suitable for removably connecting the mounting tab 10 to the tackle container 20 is sufficient. The receiving slot 22 is incorporated in the tackle container 20 using at least one of a dividing wall 24 or an interior surface. The receiving slot 22 may secure the mounting tab 10 along one side (e.g., a bottom edge or a side edge of the mounting tab 10) or the mounting tab 10 may be secured by multiple receiving slots 22, such as between a pair of substantially parallel receiving slots 22 disposed along opposite edges of the mounting tab 10.

The tackle container 20 preferably includes a series of spaced apart sets of receiving slots 22 disposed along at least one of an interior dividing wall 24 or an inside surface of the tackle container 20. The series of receiving slots 22 are used to removably receive a corresponding series of mounting tabs 10 that compartmentalize the tackle container 20 and maintain organization of rigs and other tackles. The series of mounting tabs 10 are arranged perpendicular to the at least one of said dividing wall 24 and/or interior surface to minimize conditions generally prone to entanglement of proximately positioned fishing rigs.

The dividing walls 24 are connectably rearrangeable inside the tackle container 20 to provide a number of different configurations for securing the mounting tabs 10. At least one of the dividing walls 24 or the interior surface may be arranged perpendicularly to at least one of a second dividing wall or a second interior surface to arrange the tackle container 20 in various configurations. A tall interior surface or dividing walls 22 positioned above one another may provide a multi-level arrangement for securing the mounting tabs 10.

In other embodiments, the tackle container 20 is insulated around an exterior similar to a conventional cooler. The tackle container 20 may also include at least one receiving slot 20 incorporated in the exterior of the tackle container 20 to receive and secure an additional tackle item. Further embodiments of the tackle storage system include conventional tackle containers 20, such as three-box hard cover, three-box duffle bag, two-box backpack, tackle binders having at least one pouch or sleeve, or utility boxes, that have been modified to incorporate a receiving slot 22 for removably receiving a mounting tab 10.

Although selected embodiments of the invention have been described in the forgoing specification, it is understood by those skilled in the art that many modifications and embodiments of the invention will come to mind to which the invention pertains, having benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for purposes of limiting the description of the invention.

What is claimed is:

1. A fishing rig storage system, comprising:
   a mounting tab having
      quartered sections,
      a plurality of notches formed along a perimeter, each of said quartered sections having at least one of said plurality of notches, and
      a first slit extending from said perimeter to removably attach a tail to said mounting tab; and
   a fishing rig having a hook assembly and a line including the tail, said hook assembly being secured to a first notch of said plurality of notches and extending in a direction of an opposing second notch, the line being predominantly wrapped within and between the second notch and a third notch and the first notch and a fourth notch such that there is only a single wrap within and between the first notch and the third notch, the second and third notch being located in adjacent quartered sections and the first and fourth notch being located in adjacent quartered sections,
   wherein
      said line is selectively wrapped around said mounting tab without overlaying said hook assembly when said line extends between said plurality of notches other than at said first notch and
      said line does not extend between any notch parallel to said hook assembly.

2. The fishing rig storage system according to claim 1, wherein the mounting tab includes at least one of a rounded corner or a beveled corner formed at said perimeter and configured to mate with a corresponding receiving slot of a tackle container.

3. The fishing rig storage system according to claim 1, wherein the mounting tab further includes a second slit extending from said perimeter to removably attach said tail to said mounting tab at an alternative location.

4. The fishing rig storage system according to claim 1, wherein said mounting tab includes a magnet.

5. The fishing rig storage system according to claim 1, wherein said mounting tab is comprised of a magnetic material.

6. The fishing rig storage system according to claim 1, wherein said mounting tab is secured by commercial packaging including at least one of a box, a strap, a backboard, shrink wrap, a sleeve, a binder, a sealed bag, or a container.

7. A fishing rig storage system, comprising:
 a mounting tab having
  quartered sections,
  a plurality of notches formed along a perimeter, each of said quartered sections having at least one of said plurality of notches, and
  a first slit extending from said perimeter to removably attach a tail to said mounting tab; and
 a fishing rig having a hook assembly and a line including the tail, said hook assembly being secured to a first notch of said plurality of notches and extending in a direction of an opposing second notch, the line being predominantly wrapped within and between the second notch and a third notch and the first notch and a fourth notch such that there is only a single wrap within and between the first notch and the third notch, the second and third notch being located in adjacent quartered sections and the first and fourth notch being located in adjacent quartered sections; and
 a tackle container having at least one of a first dividing wall or a first interior surface and a receiving slot incorporated in the at least one of said first dividing wall or said first interior surface to secure said mounting tab at said perimeter,
 wherein
 said mounting tab is removably insertable into said receiving slot,
 said line is selectively wrapped around said mounting tab without overlaying said hook assembly when said line extends between said plurality of notches other than at said first notch, and
 said line does not extend between any notch parallel to said hook assembly.

8. The fishing rig storage system of claim 7, wherein said mounting tab further includes at least one of a rounded corner or a beveled corner disposed at said perimeter of said mounting tab and configured to mate with a corresponding receiving slot of the tackle container.

9. The fishing rig storage system of claim 7, wherein the mounting tab includes a second slit extending from said perimeter to removably attach said tail to said mounting tab at an alternative location.

10. The fishing rig storage system of claim 7, wherein said perimeter of said mounting tab includes a plurality of edges and at least one of said plurality of notches is centrally disposed along at least one of said plurality of edges.

11. The fishing rig storage system of claim 7, wherein the tackle container includes a series of receiving slots incorporated in the at least one of said first dividing wall or said first interior surface for receiving a series of removably insertable mounting tabs.

12. The fishing rig storage system of claim 7, wherein the tackle container further includes at least one of a second dividing wall or a second interior surface extending perpendicularly from the at least one of said first dividing wall or said first interior surface, said first and second dividing walls or second interior surfaces being connectably rearrangeable in said tackle container.

13. The fishing rig storage system of claim 12, wherein said first and second dividing walls or interior surfaces further include a multi-level arrangement for storing said mounting tab in said tackle container.

14. A method of using a fishing rig storage device including a mounting tab having quartered sections, a slit, and a plurality of notches formed along a perimeter, each of said quartered sections having at least one of said plurality of notches, and a fishing rig having a hook assembly, a line, and a tail, comprising:
 securing said hook assembly to a first notch of said plurality of notches and extending said hook assembly in a direction of an opposing second notch;
 wrapping the line predominantly within and between the second notch and a third notch and the first notch and a fourth notch such that there is only a single wrap within and between the first notch and the third notch, said line being selectively wrapped around said mounting tab without overlaying said hook assembly when said line extends between said plurality of notches other than at said first notch, and said line does not extending between any notch parallel to said hook assembly, the second and third notch being located in adjacent quartered sections and the first and fourth notch being located in adjacent quartered sections; and
 removably attaching said tail to said slit.

15. The method of using a fishing rig storage device according to claim 14 further comprising:
 securing said mounting tab by commercial packaging including at least one of a box, a strap, a backboard, shrink wrap, a sleeve, a binder, a sealed bag, or a container.

16. The method of using a fishing rig storage device according to claim 14 further comprising:
 removably inserting said mounting tab into a receiving slot incorporated in a tackle container.

17. The method of using a fishing rig storage device according to claim 14 further comprising:
 modifying a tackle container to include a receiving slot for removably inserting said mounting tab.

18. The method of using a fishing rig storage device according to claim 14 further comprising:
 unwinding the line and hook assembly from said mounting tab by elevating and securing only the tail thereby allowing the line to unravel from the mounting tab without catching on the hook assembly.

* * * * *